E. L. WRIGHT & T. M. BIOSSAT, Jr.
DIFFERENTIAL GEARING.
APPLICATION FILED OCT. 20, 1911.
1,032,261.
Patented July 9, 1912.
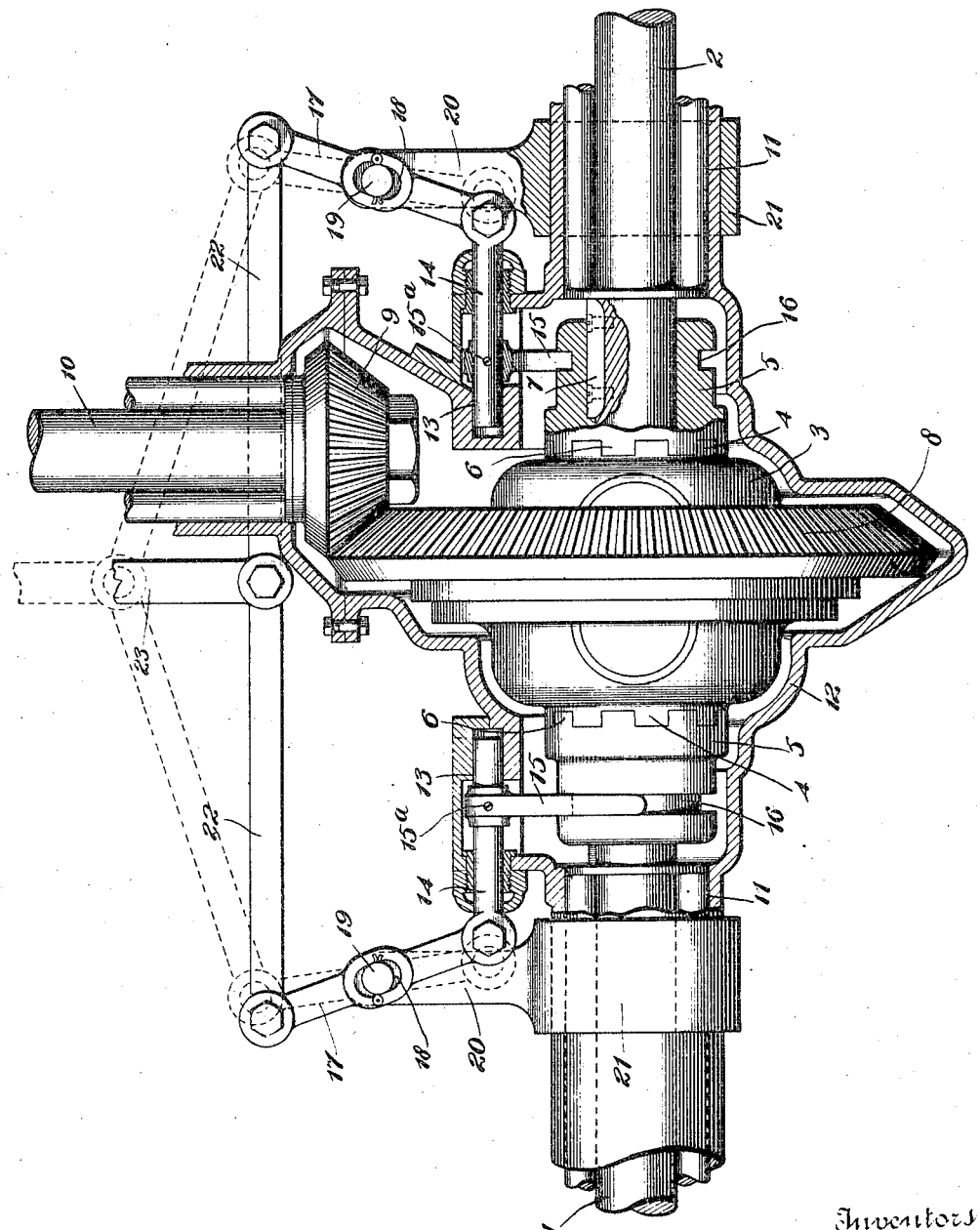
Witnesses
Byron B. Collings
Inventors
T. M. Biossat, Jr. and
E. L. Wright,
By Wilkinson, Fisher & Witherspoon
Attorneys

UNITED STATES PATENT OFFICE.

ELMO L. WRIGHT AND THOMAS M. BIOSSAT, JR., OF LA FAYETTE, LOUISIANA.

DIFFERENTIAL GEARING.

1,032,261. Specification of Letters Patent. Patented July 9, 1912.

Application filed October 20, 1911. Serial No. 655,825.

*To all whom it may concern:*

Be it known that we, ELMO L. WRIGHT and THOMAS M. BIOSSAT, Jr., citizens of the United States, residing at La Fayette, in the parish of Lafayette and State of Louisiana, have invented certain new and useful Improvements in Differential Gearing; and we do hereby declare the following to be a full, clear, and exact description of the invention, such as will enable others skilled in the art to which it appertains to make and use the same.

This invention relates to improvements in differential gearing, and is especially useful for locking the divided axle of an automobile to drive the axle sections in unison.

The object of the invention is to provide simple and practical means, which will enable the driver to lock the axle sections for driving an automobile over slippery places or pulling it out of mud holes when one of the driving wheels is on dry or level ground.

The invention also consists in certain combinations and arrangements of the parts more fully hereinafter described, and the novel features thereof will be distinctly pointed out in the appended claims.

For a clear understanding of the invention, reference will be had to the accompanying drawing illustrating a preferred embodiment thereof, and in which drawings like characters of reference indicate corresponding parts:

The drawing illustrates differential gearing with our invention applied thereto.

1 and 2 represent the sections of a divided axle having at their adjacent ends differential gearing of ordinary construction inclosed by a casing 3, which is provided at its ends with teeth 4. Collars 5, having corresponding teeth 6 adapted to mesh with the teeth 4, are slidably mounted on the sections 1 and 2 of the divided axle, but caused to rotate therewith by means of the keys 7 fixed to the sections. A large bevel gear wheel 8 surrounds the casing 3 and is fixed thereto in any suitable manner. A bevel pinion 9, carried by a driving shaft 10 rotated from any suitable source of power, meshes with the gear wheel 8 for driving same.

The sections 1 and 2 of the divided axle are journaled, preferably on rollers, in the end bearings 11 of a suitable housing 12 inclosing the parts described, and slidably mounted in the housing, as at 13, are pins 14 which carry depending forked members 15 engaging an annular recess 16 of the collars 5. The forked members 15 are secured to the pins 14 by means of set screws 15$^a$ in order to permit the dismounting of the parts. The pins 14 are pivotally connected to levers 17 having elongated apertures 18, which receive bearing pins 19 carried by the projecting arms 20 of brackets 21 rigidly secured to the ends of the housing 12. The free ends of the levers 17 are pivotally connected to links 22, which are pivotally connected to an operating rod 23. The collars 5 are moved longitudinally to lock the sections 1 and 2 of the divided axle to the casing 3, and thereby cause the two sections of the axle to turn uniformly as one axle. Said collars 5 are operated by a foot lever (not shown) which actuates the operating rod 23 in the direction of the arrow. By releasing the foot lever, the collars 5 will be detached from the differential gearing casing 3.

It is thought the operation and advantages of our invention will be clearly understood by those familiar with the art without further explanation, and it is to be understood that slight changes in the details of construction and combinations and arrangements of the parts may be resorted to within the scope of the claims.

Having fully described our invention what we claim is:—

1. In a locking device for differential gearing, the combination of a divided axle, differential gearing connecting the sections of the axle including a casing, means for rotating the casing, and means for connecting the casing to the sections of the axle, substantially as described.

2. In a locking device for differential gearing, the combination of a divided axle, differential gearing connecting the sections of the axle including a casing, collars mounted on the sections of the axle, keys connecting said collars to the sections of the axle, means for rotating the casing, and means for causing the collars to engage the casing, substantially as described.

3. In a locking device for differential gearing, the combination of a divided axle, differential gearing connecting the sections of the axle including a casing provided with teeth at the ends thereof, collars slidably mounted on the sections of the axle and provided with teeth adapted to engage the teeth on the casing, keys fixed to the sections of the axle and engaging said collars, slidably mounted pins, depending arms carried by the pins engaging the collars, means for rotating the casing, and means for moving the pins, substantially as described.

4. In a locking device for differential gearing, the combination of a divided axle, differential gearing connecting the sections of the axle including a casing provided with teeth at the ends thereof, collars slidably mounted on the sections of the axle, and provided with teeth adapted to engage the teeth on said casing, keys fixed to the sections of the axle and engaging said collars, slidably mounted pins, depending arms carried by the pins engaging the collars, a gear wheel fixed to the casing, a driven pinion meshing with the gear wheel, and means for moving said pins, substantially as described.

5. In a locking device for differential gearing, the combination of a divided axle, differential gearing connecting the sections of the axle including a casing provided with teeth at the ends thereof, collars slidably mounted on the sections of the axle, and provided with teeth adapted to engage the teeth on said casing, keys fixed to the sections of the axle and engaging said collars, slidably mounted pins, depending arms carried by the pins engaging the collars, means for rotating the casing, pivoted levers connected to said pins, an operating rod, means connecting the free ends of the links to the operating rod, and means for actuating the operating rod, substantially as described.

In testimony whereof, we affix our signatures, in presence of two witnesses.

ELMO L. WRIGHT.
THOMAS M. BIOSSAT, Jr.

Witnesses:
C. A. E. MOUTON,
DAN DABAUM.